ns are linked to improving stability when traveling and to suppressing uneven tire wear.

US 10,551,185 B2
Page 1

(12) United States Patent
Shimada

(10) Patent No.: US 10,551,185 B2
(45) Date of Patent: Feb. 4, 2020

(54) METHOD OF INSPECTING WHEEL ALIGNMENT

(71) Applicant: Shimada Jidosha Industry Co., Ltd., Asahikawa-shi, Hokkaido (JP)

(72) Inventor: Toshifumi Shimada, Asahikawa (JP)

(73) Assignee: SHIMADA JIDOSHA INDUSTRY CO., LTD., Hokkaido (JP)

( * ) Notice: Subject to any disclaimer, the term of this patent is extended or adjusted under 35 U.S.C. 154(b) by 110 days.

(21) Appl. No.: 15/749,035

(22) PCT Filed: Oct. 28, 2016

(86) PCT No.: PCT/JP2016/082049
§ 371 (c)(1),
(2) Date: Jan. 30, 2018

(87) PCT Pub. No.: WO2017/073724
PCT Pub. Date: May 4, 2017

(65) Prior Publication Data
US 2018/0224274 A1   Aug. 9, 2018

(30) Foreign Application Priority Data
Oct. 30, 2015   (JP) .................................. 2015-214248

(51) Int. Cl.
*G01B 21/26*   (2006.01)
*G01M 17/013*   (2006.01)
*G01M 17/04*   (2006.01)

(52) U.S. Cl.
CPC ........... *G01B 21/26* (2013.01); *G01M 17/013* (2013.01); *G01M 17/04* (2013.01);
(Continued)

(58) Field of Classification Search
CPC . G01B 21/26; G01B 2210/26; G01M 17/013; G01M 17/04; B60G 2200/46;
(Continued)

(56) References Cited

U.S. PATENT DOCUMENTS 4,239,389 A * 12/1980 Hollandsworth ...... G01B 11/26
                                                        33/288
4,341,468 A *  7/1982 Hollandsworth .. G01B 11/2755
                                                        33/228
(Continued)

FOREIGN PATENT DOCUMENTS

JP      H09243352 A    9/1997
JP       2880251 B2    4/1999
(Continued)

OTHER PUBLICATIONS

ISR issued in connection with PCT/JP2016/082049.
Written Opinion issued in connection with PCT/JP2016/082049.

*Primary Examiner* — Laura Freedman
(74) *Attorney, Agent, or Firm* — Potomac Law Group, PLLC; Kenneth Fagin

(57) ABSTRACT

The invention makes it easy to link wheel alignment inspections to improving stability when traveling and to suppressing uneven tire wear. The straight running state of a vehicle is verified (S1), and the vehicle is placed on a tester in the straight running state (S2). The wheel alignment of the vehicle in the straight running state is measured using the tester (S3). The individual toe of each front wheel and each rear wheel is adjusted to eliminate differences between the left and right wheels (S4). The wheel alignment, such as the included angle, is measured again, and the causes of any wheel alignment failures are narrowed down on the basis of the measurement results (S5 to S7). Wheel alignment fail- (Continued)

ures impacting steering pull or uneven tire wear are evaluated on the basis of the results of the measurements in S3 (S8).

4 Claims, 9 Drawing Sheets

(52) U.S. Cl.
CPC .... *B60G 2200/46* (2013.01); *B60G 2200/464* (2013.01); *B60G 2200/4622* (2013.01)

(58) Field of Classification Search
CPC ...... B60G 2200/462; B60G 2200/4622; B60G 2200/464
See application file for complete search history.

(56) References Cited

U.S. PATENT DOCUMENTS

| | | | | |
|---|---|---|---|---|
| 4,574,490 | A * | 3/1986 | Curchod | G01B 7/144 33/203.18 |
| 4,718,759 | A * | 1/1988 | Butler | G01B 11/275 33/203.18 |
| 4,863,266 | A * | 9/1989 | Masuko | G01B 11/2755 356/139.09 |
| 5,111,585 | A * | 5/1992 | Kawashima | G01B 7/315 33/203.12 |
| 5,208,646 | A * | 5/1993 | Rogers | G01B 5/255 33/288 |
| 5,586,062 | A * | 12/1996 | Colarelli, III | G01B 11/2755 33/203.18 |
| 7,043,396 | B2 * | 5/2006 | Larson | G01B 21/26 33/203.14 |
| 7,278,215 | B2 * | 10/2007 | Hara | G01B 21/26 33/203.15 |

FOREIGN PATENT DOCUMENTS

| | | |
|---|---|---|
| JP | 3008718 B2 | 2/2000 |
| JP | 20112334 A | 1/2011 |
| JP | 2016217934 A * | 12/2016 |
| JP | 2016218045 A * | 12/2016 |
| JP | 2017003550 A * | 1/2017 |
| JP | 2018048879 A * | 3/2018 |
| WO | WO 2017/073724 | 5/2017 |

* cited by examiner

METHOD OF INSPECTING WHEEL ALIGNMENT

TECHNICAL FIELD

The present invention relates to an inspection method of wheel alignment.

BACKGROUND ART

Inspecting the wheel alignment in a vehicle having four wheels such as automobiles is important for ensuring stability during running and for suppressing uneven wear of the tires. PTL 1 relates to a device for measuring a thrust angle, a toe angle and a camber angle in a state close to actual running. The state of the wheel alignment during actual running significantly influences the stability at the time of running and uneven wear of the tire.

CITATION LIST

Patent Literature

[PTL 1] Japanese Unexamined Patent Publication No. H9-243352

SUMMARY OF INVENTION

Technical Problem

The wheel alignment is inspected to ensure the stability during running and to suppress uneven wear of the tires by setting appropriate wheel alignment. In traditional art, if there is an abnormality in the camber angle or the like based on an inspection result of the wheel alignment of PTL 1, the wheel alignment is adjusted to address such an abnormality. The inventor of the present invention however found out that simply adjusting the wheel alignment as in the traditional art does not necessarily lead to running stability and suppression of uneven wear of the tires.

It is therefore an object of the present invention to provide a method of inspecting wheel alignment which is likely to lead to running stability and suppression of uneven wear of tires.

Solution to Problem

The inventor of the present invention has noticed the following problems related to the traditional art as a result of long-standing devoted studies on adjustment of wheel alignment (hereinafter, alignment adjustment). In the traditional art, when abnormalities are found in the measured values of the camber and the like, the abnormalities are addressed at once through alignment adjustment. This way, the alignment adjustment appears to be properly done. However, in traditional art, the cause of problems in the wheel alignment may not be solved and the running stability may not be achieved and the uneven wear of tires may not be sufficiently suppressed, although it appears that the wheel alignment is appropriately adjusted.

According to the knowledge of the inventor of the present invention, the above-mentioned problems in the traditional art are attributed to the followings. A difference between left and right of individual toes of rear wheels may cause a thrust angle on the vehicle. In such a case, a left-right difference occurs in the individual toes of the front wheels at a time of straight running. As a result, the values of the camber and the like at the time of straight running also deviate from their normal values. Misalignment in the camber and the like may lead to steering pull and uneven wear of tires. Problems in wheel alignment such as camber misalignment and the like are also attributed to a cause other than the above-described thrust angle. Examples include an abnormality such as deformation and the like in a part of a steering device (steering) or a suspension device (suspension). That is, for example, when the measured value of the camber deviates from the normal value, that deviation may be caused by a combination of both the thrust angle and other factors.

The traditional art however merely solve a problem in the wheel alignment which could lead to steering pull or uneven wear of tires, without detailed analysis of the cause of the problem. Therefore, the inspection result of the wheel alignment may not be appropriately linked to grasping of the cause, and the cause of the problem may not be able to appropriately addressed. As described, the traditional art does not necessarily link the inspection result of the wheel alignment to running stability and suppression of uneven wear of tires.

Based on the above findings, the present inventors have reached the present invention as described below. An inspection method of wheel alignment, according to the present invention, includes: a first alignment measurement step of measuring wheel alignment with reference to positions of front wheels during straight running of a vehicle causing a thrust angle, wherein at least one of front wheel camber, front wheel caster, a front wheel included-angle, setback, and a turning angle when the front wheels are rotated to a predetermined state is measured as a specific measurement target; an adjustment step of adjusting the individual toes after the first alignment measurement step, wherein the individual toes are adjusted to eliminate a left-right difference in relation to the front wheels and rear wheels of the vehicle, when the specific measurement target includes the setback, whereas the individual toes are adjusted to eliminate the left-right difference in the individual toes at least in relation to the front wheels of the vehicle, when the specific measurement target does not include the setback; a second alignment measurement step of measuring again the wheel alignment, relative to the specific measurement target after the adjustment step; a first evaluation step of evaluating a defect of wheel alignment which influences at least one of wear on tires and steering pull in the vehicle before the adjustment step, based at least on the measurement result of the first alignment measurement step; and a second evaluation step of evaluating a cause of a defect in the wheel alignment, based at least on the measurement result of the second alignment measurement step.

With the present invention, in the first alignment measurement step, the wheel alignment of the camber and the like of the front wheels of a vehicle in which a thrust angle takes place is measured with reference to the positions of the front wheels during straight running. Based on this, in the first evaluation step, it is possible to grasp a defect of the wheel alignment during the actual straight running, which most influences the steering pull and the uneven wear of tires. On the other hand, in the adjustment step after the first alignment measurement step, the individual toes of the front wheels (or both front and rear wheels) are adjusted to eliminate the left-right difference. In other words, the individual toes are adjusted so as to achieve straight running without a thrust angle. This solves a defect out of defects in the wheel alignment, which is attributed to the thrust angle. Therefore, if there is still an abnormality in the camber and the like after the measurement of the wheel alignment in the second alignment measurement step, an abnormality in other than the thrust angle, such as the steering device or the suspension device, could be the cause of the defect of the wheel alignment. As described, a defect in the wheel alignment other than a cause attributed to the thrust angle is evaluated in the second evaluation step, based on the measurement result of the second alignment measurement step.

In the present invention as described above, the wheel alignment of a vehicle having a thrust angle is measured before and after the adjustment step of adjusting the individual toes to achieve the straight running without the thrust angle. Therefore, it is possible to appropriately evaluate a defect in the wheel alignment at a time of actual running, which most influences the steering pull and the uneven wear of tires, and to appropriately evaluate the cause of the defect in the wheel alignment. Thus, the inspection result of the wheel alignment is appropriately connected to stable running and restraint of the uneven wear of tires. In cases of conducting the measurement only before the adjustment step, on the other hand, the cause of the defect is not appropriately grasped. In cases of conducting the measurement only after the adjustment step, the influence of the defect to the steering pull or the uneven wear of tires is not appropriately evaluated. These evaluations are possible by conducting measurements both before and after the adjustment step as in the present invention.

It should be noted that the first evaluation step may be conducted at any time after the first alignment measurement step. The second evaluation step may be conducted at any time after the second alignment measurement step. Further, in the first alignment measurement step, the wheel alignment may be measured in regard to the specific measurement target only, or items of the wheel alignment other than the specific measurement target may be measured. Further, in the second alignment measurement step too, the wheel alignment may be measured in regard to the specific measurement target only, or items of the wheel alignment other than the specific measurement target may be measured. The above expression "individual toes are adjusted to eliminate the left-right difference" may mean that the left-right difference of the individual toes is made zero, or may mean that the left-right difference of the individual toes is brought to a predetermined reference value or lower.

Further, in the present invention, the second alignment measurement step includes a step of measuring a first turning angle of a right front wheel, while a left front wheel is rotated in a first direction which is one of left and right direction so that a turning angle of the left front wheel is a first angle which is smaller than an angle corresponding to full-lock, and a step of measuring a second turning angle of the left front wheel, while the right front wheel is rotated in a second direction which is opposite to the first direction so that a turning angle of the right front wheel is the first angle; and wherein, in the second evaluation step, a cause of a defect in the wheel alignment is evaluated, based at least on the first turning angle and the second turning angle. In the above, the possibility of an abnormality taking place in a part and the like of the steering device is high, if the turning angles measured in relation to the first direction and the second direction, in the second alignment measurement step after the adjustment step, are different from each other. Thus, in the second evaluation step, a cause of a defect in the wheel alignment is appropriately evaluated, based on the first turning angle and the second turning angle.

Further, in the present invention, the second alignment measurement step includes a step of measuring a third turning angle of the right front wheel, while the left front wheel is rotated in the first direction so that a turning angle of the left front wheel is the full-lock or a second angle which is different from the first angle, and a step of measuring a fourth turning angle of the left front wheel, while the right front wheel is rotated in the second direction so that the turning angle of the right front wheel is the full-lock or the second angle; and wherein, in the second evaluation step, a cause of the defect of the wheel alignment is evaluated by evaluating a change in deviation of the turning angle with respect to the turning angle of the front wheels, based at least on the first turning angle to the fourth turning angle. According to the knowledge of the present inventor, the deviation in the turning angle increases with an increase in the turning angle, when the steering knuckle arm is bent. Based on this, whether or not there is a bend portion in the steering knuckle arm is appropriately grasped by evaluating the change in the deviation of the turning angle as in the first turning angle and the second turning angle (or full-lock).

Further, in the present invention, in the second alignment measurement step, the setback and the caster of the left front wheel and the right front wheel are measured; and in the second evaluation step, when the setback is a predetermined size or more, a cause of the setback taking place is evaluated, based on at least either one of the following factors: whether or not the caster of the front wheels has a left-right difference; and the caster of which one of the left front wheel and the right front wheel has an abnormality. In the above, the possibility of a defect taking place in the suspension device is high, if there is an abnormality in the setback and the caster of the left front wheel or the right front wheel, in the second alignment measurement step after the adjustment step. Therefore, in the second evaluation step, when the setback is a predetermined value or more, a cause of the setback taking place is appropriately evaluated, based on whether or not the caster of the front wheels has a left-right difference; and whether or not the caster of the left front wheel or the right front wheel has an abnormality.

BRIEF DESCRIPTION OF THE DRAWINGS

FIG. 3 is a schematic structure diagram of a steering device of the automobile shown in FIG. 1, wherein

FIG. 8 is a schematic structure diagram of a steering device of the automobile shown in FIG. 1, wherein

DESCRIPTION OF EMBODIMENTS

Figure 1:
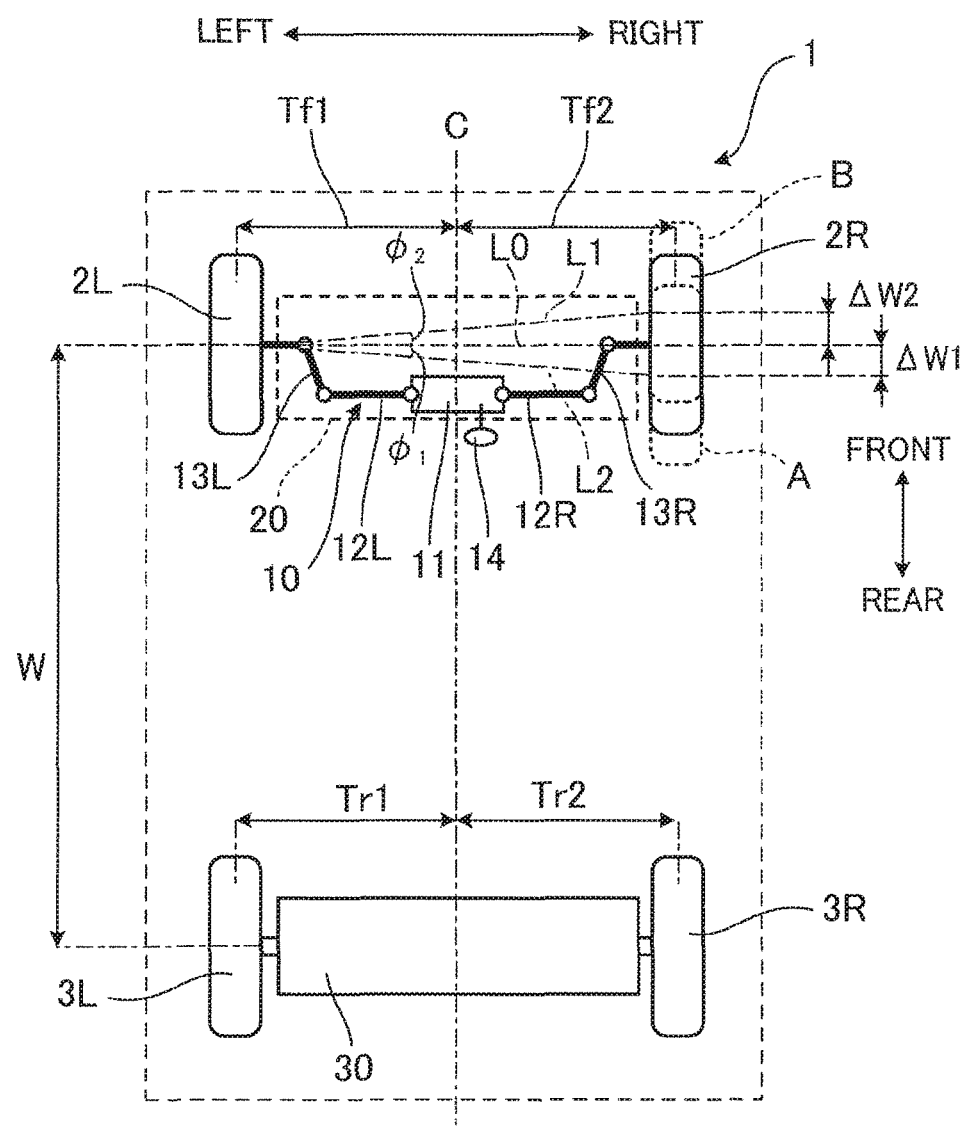
FIG. 1 is a schematic structure diagram of an automobile which is an inspection target of an inspection method of the wheel alignment related to one embodiment of the present invention.

The following describes, with reference to FIG. 1 to FIG. 6, an inspection method of wheel alignment (hereinafter, the present inspection method) related to one embodiment of the present invention. FIG. 1 shows a schematic structure of an automobile 1 which is a target of the present inspection method. The automobile 1 includes: front wheels 2L (left front wheel) and 2R (right front wheel), rear wheels 3L and 3R, a steering device 10, a front side suspension device 20, and a rear side suspension device 30.

The steering device 10 has a rack 11, tie rods 12L and 12R, steering knuckle arms 13L and 13R, and a steering wheel 14. When a driver operates the steering wheel 14, the rotating motion of the steering wheel 14 is transmitted to the rack 11 via a not-shown pinion gears, and the rack 11 moves in the left-right directions. The movement of the rack 11 is transmitted to the steering knuckle arms 13L and 13R via the tie rods 12L and 12R, thereby rotating the steering knuckle arms 13L and 13R. Through this, the front wheels 2L and 2R are rotated (see FIG. 3(a) and FIG. 3(b)). The engine of the automobile 1 is provided with various structures to let the driver to drive the automobile 1, such as a transmission mechanism for transmitting the driving force from the engine to the rear wheels 3L and 3R, an operation unit other than the steering handle 14, and the like.

In the following, the term "full-lock" means to steer the steering wheel 14 all the way to the left or right, or a state in which the steering wheel 14 is steered all the way to either way. An outer side front wheel or an inner side front wheel means a front wheel out of the front wheels 2L and 2R, which is positioned on the outer side or the inner side, in the rotating movement of the automobile 1 which takes place when the steering wheel 14 is steered to the left or right while the automobile 1 is running. The turning angle of a front wheel means a rotation angle of the front wheel with reference to the straight-traveling state as shown in FIG. 1. For example, the turning angle of the front wheel is an angle indicated by $\alpha$ or $\beta$ in FIG. 3(a) or FIG. 3(b). The $\alpha$ in FIG. 3(a) indicates the turning angle of the outer side front wheel (front wheel 2R) when the front wheels are steered to the left. The $\beta$ in FIG. 3(a) indicates the turning angle of the inner side front wheel (front wheel 2L) when the front wheels are steered to the left. The $\alpha$ in FIG. 3(b) indicates the turning angle of the outer side front wheel (front wheel 2L) when the front wheels are steered to the right. The $\beta$ in FIG. 3(b) indicates the turning angle of the inner side front wheel (front wheel 2R) when the front wheels are steered to the right. In the following description, the turning angle of the inner side front wheel is represented by $\alpha n$, and the turning angle of the outer side front wheel is indicated by $\beta n$.

The front side suspension device 20 is, for example, a suspension device of an independent suspension type, and includes: left and right wheel supporting portions each having a knuckle configured to rotatably support the front wheel 2L or 2R, and an upper arm and a lower arm which links the knuckle with the vehicle body frame; a stabilizer for connecting the left and right wheel supporting portions to each other; tension rods whose trailing ends are connected to the left and right of the wheel supporting portions, respectively, and whose front ends are connected to the vehicle body frame; and the like. Note that the stabilizer and the tension rods may be separate structures or may be structured in one piece so that a single member function as both of them. The steering knuckle arms 13L and 13R are parts of the left and right knuckles, respectively.

The rear side suspension device 30 is, for example, a suspension device of a beam axle type, and includes left and right axle supporting portions and the like having a torque rod and a lower arm which connects and supports the axle fixed to the rear wheels 3L and 3R to the vehicle body frame. The members constituting the rear side suspension device 30 may be supported by the vehicle body frame through a suspension member.

The left front wheel 2L and the right front wheel 2R are arranged at the same position relative to the front-rear directions in a normal state. The left rear wheel 3L and the right rear wheel 3R are also arranged at the same position relative to the front-rear directions in a normal state. On the other hand, when a member constituting the front side suspension device 20 or the rear side suspension device 30 is deformed due to an accident and the like, there may be a setback in which wheels are misaligned relative to the front-rear directions. For example, a broken line A in FIG. 1 indicates a setback in which the front wheel 2R deviates rearward from a normal position, and a broken line B of FIG. 1 indicates a setback in which the front wheel 2R deviates forward from the normal position. As a result, as shown in FIG. 1, there will be an angle $\Phi1$ or $\Phi2$ ($\Phi1>0$, $\Phi2>0$) between a horizontal line L0 perpendicularly crossing the geometric center line C of the automobile 1, and a straight line L1 or L2 connecting the same position of the front wheels 2L and 2R. Such an angle is hereinafter referred to as setback angle.

An alignment tester device (hereinafter, tester) used in the present embodiment is capable of measuring: the turning angles of the front wheels 2L and 2R when the steering wheel 14 is rotated to a predetermined state; the setback angle, thrust angle, individual toes of the front wheels 2L and 2R, individual toes of the rear wheels 3L and 3R, and camber angles and caster angles of the front wheels 2L and 2R.

The predetermined state in the measurement of the turning angle of the present tester is a state in which the steering wheel 14 is fully locked and the state of the outer side front wheel with a turning angle of 20°. The state of the outer side front wheel with a turning angle of 20° means a state in which the turning angle of the outer front wheel is 20° (the first angle). It should be noted that the alignment tester device may be capable of measuring the turning angles of the front wheels 2L and 2R when the steering wheel 14 is brought into a state of the inner side front wheel with the turning angle of 20°. In this case, when the steering wheel 14 is set to the state of the outside front wheel with a turning angle of 20°, the turning angle of the front wheel 2L or 2R is replaced by the turning angle when the steering wheel 14 is set to a state of the inner side front wheel with a turning angle of 20°.

In addition, the tester measures the setback angle $\Psi$ as follows. This tester outputs the setback angle $\Psi$ as a deviation in the front-rear direction of only the right front wheel 2R, irrespective of which one of the front wheels 2L and 2R and the rear wheels 3L and 3R is deviated in the front-rear direction. Specifically, the present tester determines whether a separation distance between the right front wheel 2R and the right rear wheel 3R relative to the front-rear direction is longer or shorter than a separation distance W between the left front wheel 2L and the left rear wheel 3L relative to the front-rear direction. When the separation distance between the right front wheel 2R and the right rear wheel 3R relative to the front-rear direction is shorter than W by $\Delta W1$ ($>0$), only the right front wheel 2R is virtually shifted to a virtual position shifted backward by ΔW1, and outputs the setback angle Ψ of the right front wheel 2R. At this time, the tester outputs a negative value. For example, when the virtual position of the right front wheel 2R is the position indicated by the broken line A in FIG. 1, ψ=−Φ1 is output. Further, when the separation distance between the right front wheel 2R and the right rear wheel 3R relative to the front-rear direction is longer than W by ΔW2 (>0), only the right front wheel 2R is virtually shifted to a virtual position shifted forward by ΔW2, and outputs the setback angle of the right front wheel 2R. At this time, the tester outputs a positive value. For example, when the virtual position of the right front wheel 2R is the position shown by the broken line B in FIG. 1, ψ=+Φ2 is output.

As described, the setback angle Ψ output by the tester of the present embodiment indicates the deviation of either the front wheels 2L and 2R or the rear wheels 3L and 3R. The positive or negative sign of the setback angle Ψ indicates which one of the distance between the left front wheel 2L and the left rear wheel 3L and the distance between the right front wheel 2R and the right rear wheel 3R is longer. Meanwhile, the measured value of the setback angle Ψ output by the tester of the present embodiment alone does not specify the deviation takes place in which one of the front wheels 2L and 2R and the rear wheels 3L and 3R. For example, on the basis of a positive setback angle Ψ alone, it is understood that the distance between the left front wheel 2L and the left rear wheel 3L is shorter than the distance between the right front wheel 2R and the right rear wheel 3R. This state can be any of the following states: i.e., only the left front wheel 2L deviates backward; only the left rear wheel 3L deviates forward; only the right front wheel 2R deviates forward, and only the right rear wheel 3R deviates backward. Further, on the basis of a negative setback angle Ψ alone, it is understood that the distance between the left front wheel 2L and the left rear wheel 3L is longer than the distance between the right front wheel 2R and the right rear wheel 3R. This state can be any of the following states: i.e., only the left front wheel 2L deviates forward; only the left rear wheel 3L deviates backward; only the right front wheel 2R deviates backward, and only the right rear wheel 3R deviates forward.

Figure 2:
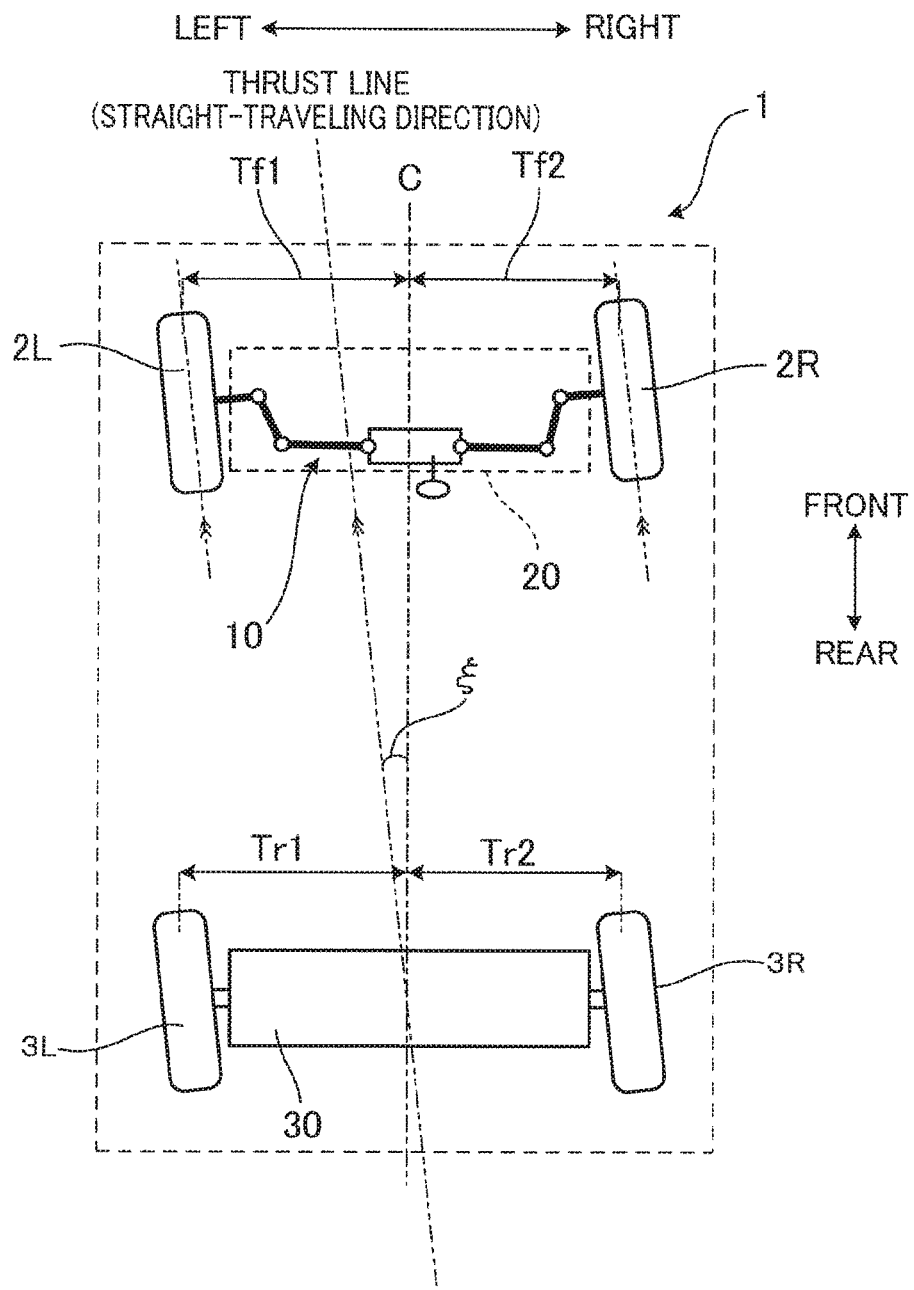
FIG. 2 is a schematic structure diagram of the automobile having a thrust angle.
Figure 3A:
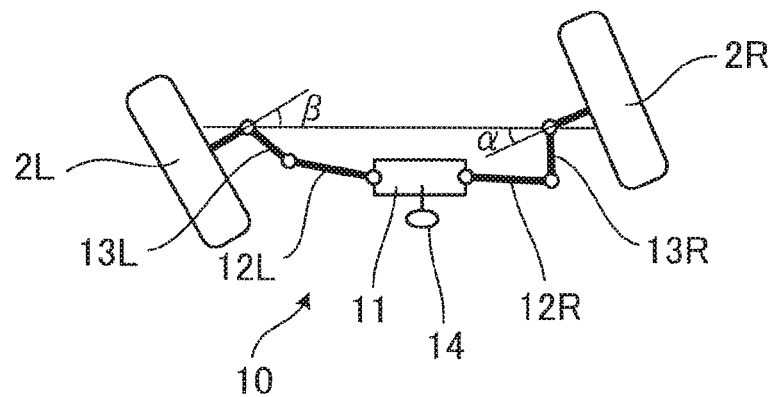
FIG. 3(a) shows a case of steering to the left.
Figure 3B:
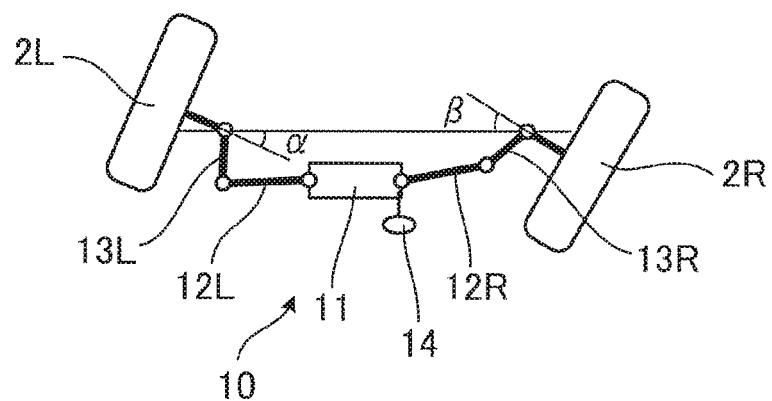
FIG. 3(b) shows a case of steering to the right.

In addition to the above, the tester can also measure the individual toes Tf1 and Tf2, the caster angles γ, the camber angles η, and the included-angles ζ, relative to the front wheels 2L and 2R, and measure the individual toes Tr1 and Tr2 relative to the rear wheels. As shown in FIG. 1, the individual toes Tf1 and Tf2 are the distances of the front ends of the front wheels 2L and 2R from the geometric center line. Further, the individual toes Tr1 and Tr2 are the distances of the front ends of the rear wheels 3L and 3R from the geometric center line. When the left-right difference Tr1−Tr2 of the individual toes of the rear wheels 3L and 3R is not zero, there is a thrust angle ξ as shown in FIG. 2. The present tester is also capable of measuring this thrust angle ξ. When the thrust angle ξ is generated, the automobile 1 will be steered so that the front wheels 2L and 2R roll along a thrust line (runs straight along the thrust line) during the straight running. As such, the left-right difference Tf1−Tf2 between the individual toes of the front wheels 2L and 2R is also no longer zero, as shown in FIG. 2. It should be noted that, the left-right difference in the individual toes of the front wheels 2L and 2R means that there is a deviation also in the turning angles α and β, the setback angle Ψ, the caster angles γ, the camber angles η, and the included-angles ζ during the straight running, as compared to the state of no left-right difference.

Figure 4:
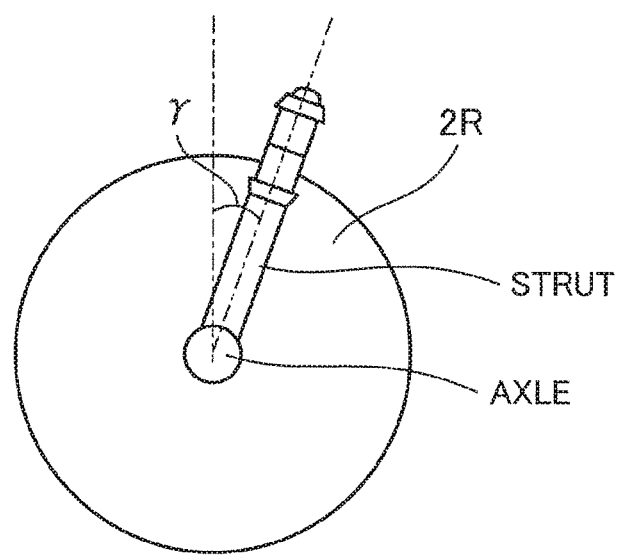
FIG. 4 is a diagram showing a right front wheel from the left, and indicates a caster angle.

The caster angle γ is an angle between the center axis of the king pin and the vertical axis, when the wheel is seen in the transverse direction (left-right direction). In many cases, kingpin is not actually provided. For example, as shown in FIG. 4, in cases where a strut-type suspension device is adopted, the caster angle γ corresponds to an angle between the center axis of the strut and the vertical axis. Further, when a suspension device of a double wishbone type and the like is adopted, the caster angle γ corresponds to an angle between the vertical axis and the rotation center axis of the wheel rotated by steering the steering wheel.

Figure 5:
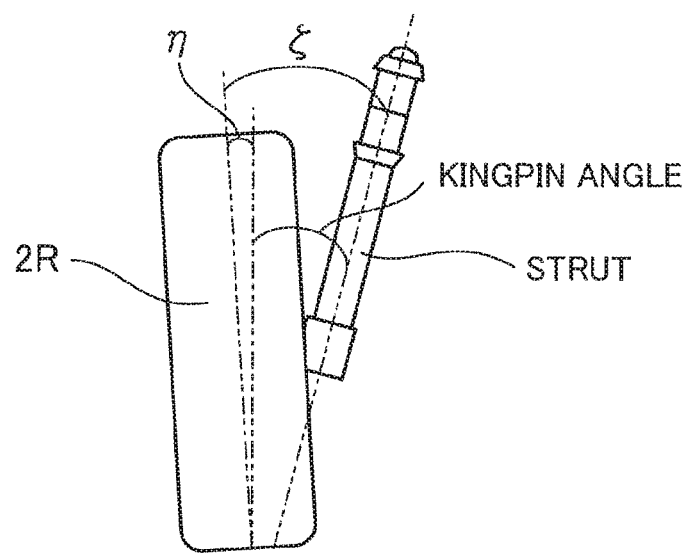
FIG. 5 is a diagram showing a right front wheel from the front, and indicates a camber angle and an included-angle.

As shown in FIG. 5, the camber angle η is an acute angle between a central axis relative to the width direction of the wheel viewed from the front and the vertical axis. The included-angle ζ is an acute angle between the above central axis and the central axis of the king pin. Supposing that an acute angle between the center axis of the kingpin and the vertical axis is a kingpin angle, the included-angle ζ corresponds to the sum of the camber angle η and the kingpin angle. For example, as shown in FIG. 5, in cases where a strut-type suspension device is adopted, the kingpin angle corresponds to an angle between the center axis of the strut and the vertical axis. Further, when a suspension device of a double wishbone type and the like is adopted, the kingpin angle corresponds to an angle between the vertical axis and the rotation center axis of the wheel rotated by steering the steering wheel.

Figure 6:
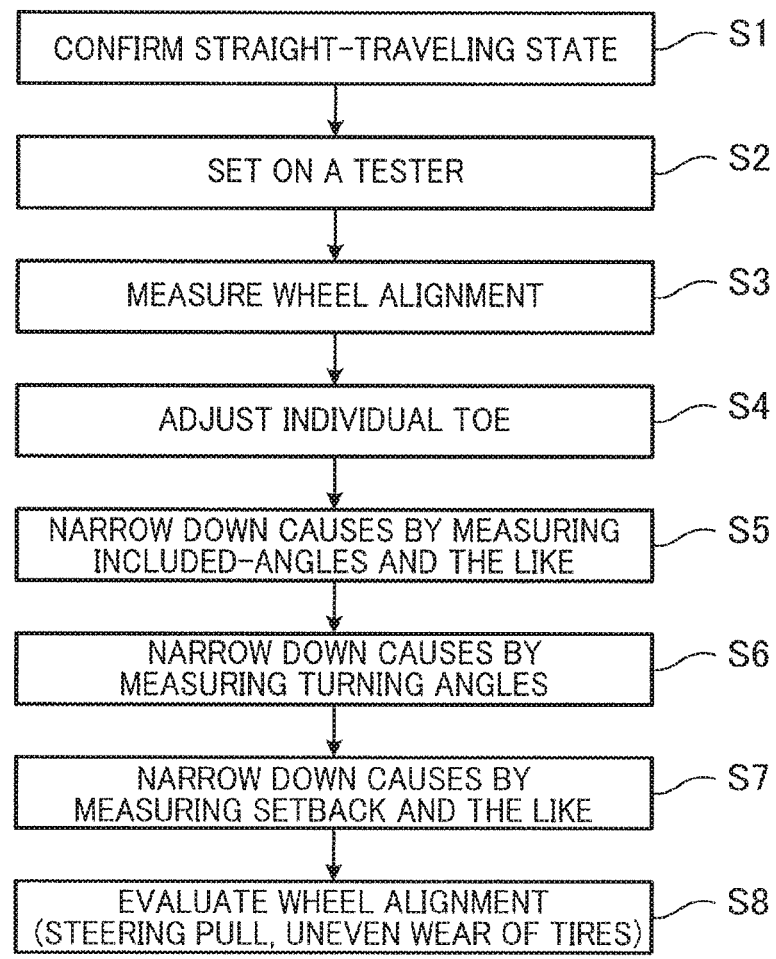
FIG. 6 is a flowchart showing a flow of the present inspection method of the wheel alignment.

The following describes a flow of the present inspection method, with reference to FIG. 6. First, in S1, the state of the automobile 1 during straight running is confirmed. The state during the straight running is confirmed by actually performing straight running of the automobile 1. The position of the steering wheel 14 during the straight running is confirmed by marking and the like for simulation later. Next, the automobile 1 is set on a tester (S2). At this time, the position of the steering wheel 14 is set to the position confirmed in S1 based on the marker and the like to simulate the state of the steering wheel 14 during straight running. Next, the wheel alignment is measured (S3: first alignment measurement step) In S2, since the steering wheel 14 is in the state of straight running, the measured value of the wheel alignment in S3 is the value during the straight running. The measurement targets in S3 include: the individual toes Tf1 and Tf2, the caster angles γ, the camber angles η, and the included-angles ζ of the front wheel 2L and 2R, the turning angle α of the inner side front wheel and the turning angle β of the outer side front wheel while the steering wheel 14 is steered left and right to the full-lock state, the setback angle Ψ, the individual toes Tr1 and Tr2 of the rear wheels 3L and 3R, and the thrust angle ξ. Part of these measurement items are measured again as the specific measurement targets, for narrowing down the causes of defect in the wheel alignment in S5 to S7 described later. In the present embodiment, the specific measurement targets are: the caster angles γ, the camber angles η, the included-angles ζ, the turning angles α and β during the full-lock state, and the setback angle Ψ.

Next, based on the individual toes Tf1, Tf2, Tr1 and Tr2 measured in S3, the individual toes are adjusted for each of the front wheels and the rear wheels so as to eliminate the left-right difference of the individual toes (S4; adjustment step). That is, the individual toes of the front wheels and the rear wheels are adjusted so as to satisfy Tf1=Tf2 and Tr1=Tr2. Alternatively, the individual toes may be adjusted so that the left-right difference of the individual toes becomes less than a predetermined value. For example, where |Tf1−Tf2|≥0.5 mm, the individual toes of the front wheels 2L and 2R may be adjusted so as to satisfy |Tf1−Tf2|<0.5 mm. The same applies to the rear wheels 3L and 3R. This way, the thrust angle ξ becomes substantially zero, and the front wheels 2L and 2R take positions during the straight running with a thrust angle of substantially zero.

Next, in S5 to S7, the causes of the defect in the wheel alignment is narrowed down (second evaluation step), by measuring again the camber angles η and the included-angles ζ, the turning angles α and β while the front wheels 2L and 2R are in the predetermined state, and the setback angle Ψ as the specific measurement targets (second alignment adjustment step). If there is still a deviation from the normal value in the camber angles η and the like, although the thrust angle ξ is made zero through the adjustment in S4, the steering device or the suspension device may have a problem. The normal value here is, for example, a value provided by the manufacturer of the automobile 1 as an initial set value at the time of manufacturing. The same goes for the following unless otherwise specifically noted. The normal value may be set as a range of values including an upper limit value and a lower limit value. In this case, the deviation from the normal value means that the value is out of the above range.

In S5 to S7, the camber angles η and the like are measured again, and based on the measurement result, whether or not the cause of the defect is in the parts of the steering device or the suspension device is determined. The camber angles η and the included-angles ζ are measured again in S5, the turning angles α and β of the front wheels 2L and the 2R during the predetermined state including the full-lock state are measured again in S6, and the setback angle Ψ is measured again in S7. This way, it is possible to evaluate what part of the steering device of the suspension device has what cause. Details of measurement and evaluation in S5 to S7 will be described later.

Next, based on the measurement result of the wheel alignment in S3 and S5 to S7, influences of the defect in the wheel alignment to the stability of running and the uneven wear of tires are comprehensively evaluated (S8; first evaluation step). In S8, evaluation is first conducted in relation to the steering pull and the uneven wear of tires of the automobile 1, based on the measurement result of the wheel alignment measured in S3. A deviation in the caster angle γ, the camber angle η or the included-angles ζ from the normal value during the straight running may cause the steering pull and the uneven wear of tires. A deviation in the setback angle Ψ from the normal value during the straight running may cause the steering pull, and a deviation in the turning angle α or β from the normal value during the full-lock state may cause uneven wear of tires. By comparing these measured values in S3 with their normal values, it is possible to evaluate, to what extent, the deviation in the measured values from their normal values caused the steering pull and the uneven wear of tires in the automobile 1 before the inspection method is conducted.

Next, based on the measured values of the caster angles γ, the camber angles η and the included-angles ζ in S5 and S7, evaluation is conducted on how much deviation in the measured value of S3 from its normal value is attributed to a cause other than the thrust angle ξ. Next, based on the measured values of the setback angle Ψ and the turning angles α and β during the full-lock state in S6 and S7, evaluation is conducted on how much deviation in the measured value of S3 from its normal value is attributed to a cause other than the thrust angle ξ. Since the thrust angle ξ is set to substantially zero in S4, the measured values in S5 to S7 indicate a defect in the wheel alignment attributed to a cause other than the thrust angle. Thus, for a defect in the wheel alignment which leads to the steering pull and the uneven wear of tires, it is possible to evaluate distinguishingly a part of the cause attributed to the thrust angle and a part of the cause attributed to a cause other than the thrust angle.

The following details the steps S5 to S7. In S5, the camber angles η and the included-angles ζ are first measured again for the front wheels 2L and 2R. Then, based on the deviation of the measured value from the normal value, the cause of defect is determined. Specifically, the cause is determined based on Table 1 below. The determination on the front wheel 2L is done by checking the measured values for the front wheel 2L against Table 1. Further, the determination on the front wheel 2R is done by checking the measured values for the front wheel 2R against Table 1. The kingpin angle in the first column of Table 1 is obtained by subtracting the camber angle η from the included-angle ζ. It should be noted that the kingpin angle may also be obtained through actual measurement. The values of the kingpin angle, the camber angle η, and the included-angle ζ in Table 1 each indicates a deviation amount from the normal value. A positive value indicates a value greater than the normal value and a negative value indicates a value smaller than the normal value. The normal value is obtained based on the initial set value published by the manufacturer of the automobile 1. The initial set value may be used as it is as the normal value but it is also possible to use, as the normal value, a value obtained by correcting the initial set value according to the elapsed years from the time of manufacturing the automobile 1 to the time of determination.

According to Table 1, for example, when the deviation amount from the normal value in the camber angle η measured again for the front wheel 2L is +1°, and the deviation amount from the normal value in the included-angle ζ measured again for the front wheel 2L is ±0°, deformation, damage, or the like in at least one of the lower arm, the strut, and the steering knuckle arm on the left side of the vehicle is suspected. Further, when the deviation amount from the normal value in the camber angle η measured again for the front wheel 2R is +1°, and the deviation amount from the normal value in the included-angle ζ measured again for the front wheel 2R is +1°, deformation, damage, or the like in at least one of the strut and the steering knuckle arm on the right side of the vehicle is suspected.

TABLE 1

| Kingpin Angle [°] | Camber Angle η [°] | Included Angle ζ [°] | Cause of Defect |
|---|---|---|---|
| −1 | ±0 | −1 | Lower Arm |
| −1 | −1 | −2 | Lower Arm, Strut, Steering Knuckle Arm |
| −1 | +1 | ±0 | Lower Arm, Strut, Steering Knuckle Arm |
| ±0 | −1 | −1 | Strut, Steering Knuckle Arm |
| ±0 | +1 | +1 | Strut, Steering Knuckle Arm |
| +1 | ±0 | +1 | Lower Arm |
| +1 | −1 | ±0 | Lower Arm, Strut, Steering Knuckle Arm |
| +1 | +1 | +2 | Lower Arm, Strut, Steering Knuckle Arm |

Figure 7:
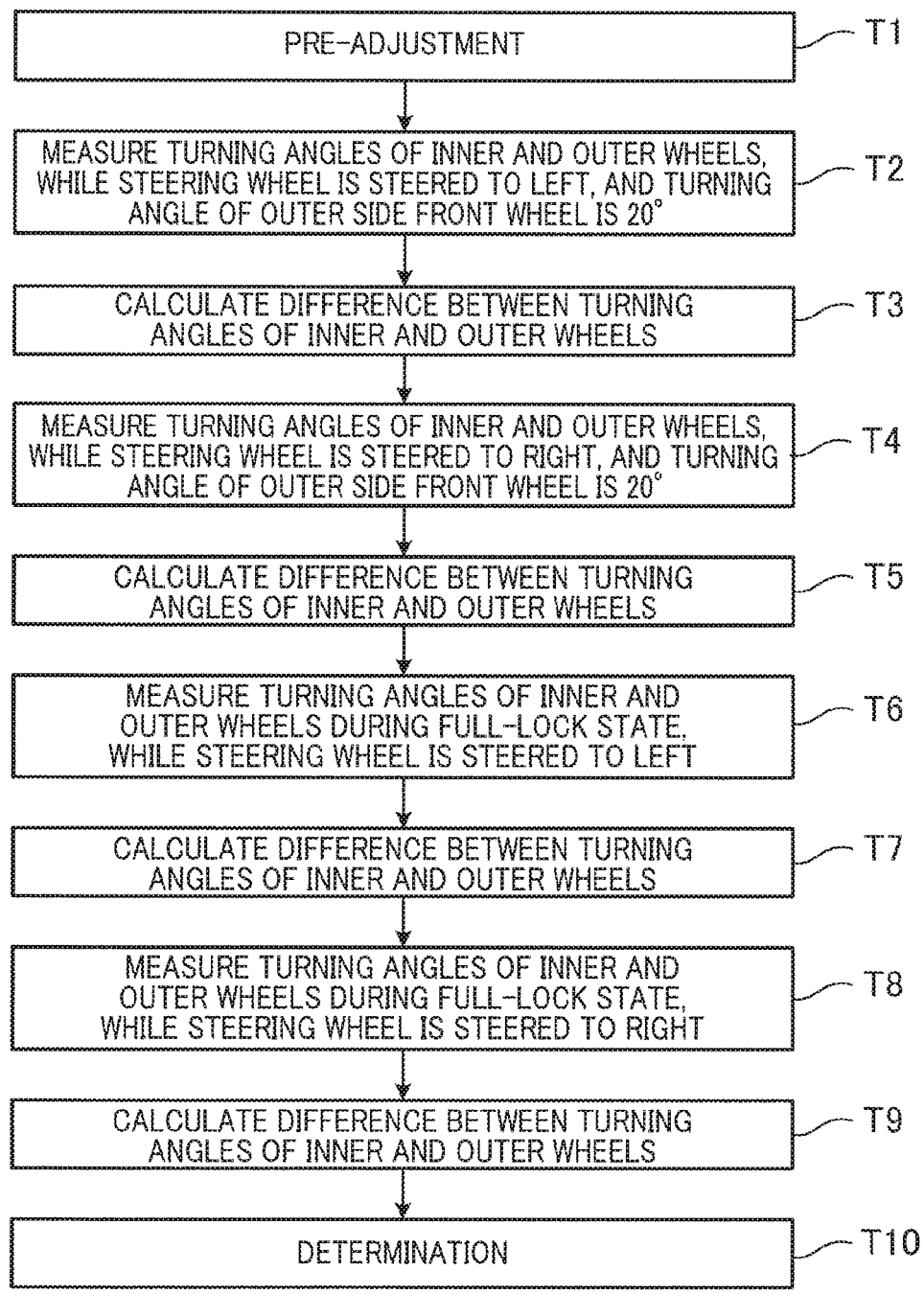
FIG. 7 is a flowchart showing a flow of steps executed in S6 of FIG. 6.

In S6, the process shown in FIG. 7 is executed. First, the automobile 1 is pre-adjusted in T1. In the process of S6, it is assumed that the front wheels 2L and 2R are in the state of the straight running with the steering wheel 14 in the center. Thus, in the pre-adjustment of T1, if the front wheels 2L and 2R are not in the state of the straight running while the steering wheel 14 is in the center, the lengths of the tie rods 12L and 12R are adjusted so that the front wheels 2L and 2R are in the state of the straight running with the steering wheel 14 in the center. It should be noted that the state of the straight running does not have to be correspond to the steering wheel 14 in the center. In this case, the state of the steering wheel 14 during the straight running may be confirmed, and this state may be used as a reference state instead of the state of the steering wheel 14 being at the center.

Next, the angles of the outer side front wheel (front wheel 2R) and the inner side front wheel (front wheel 2L) in a state where the steering wheel 14 is steered to the left (second direction) so that the turning angle of the outer side front wheel is 20° are measured by the tester (T2). Then, a difference $\beta 1-\alpha 0$ between the turning angle $\beta 1$ (second turning angle) of the inner side front wheel and the turning angle $\alpha 0$ (=20°) of the outer side front wheel at this time is calculated (T3). Next, the angles of the outer side front wheel (front wheel 2L) and the inner side front wheel (front wheel 2R) in a state where the steering wheel 14 is steered to the right (first direction) so that the turning angle of the outer side front wheel is 20° are measured by the tester (T4). Then, a difference $\beta 2-\alpha 0$ between the turning angle $\beta 2$ (first turning angle) of the inner side front wheel and the turning angle $\alpha 0$ (=20°) of the outer side front wheel at this time is calculated (T5).

Next, the angles of the outer side front wheel (front wheel 2R) and the inner side front wheel (front wheel 2L) in a state where the steering wheel 14 is steered to the left to be fully locked are measured by the tester (T6). Then, a difference $\beta 3-\alpha 1$ between the turning angle $\beta 3$ (fourth turning angle) of the inner side front wheel and the turning angle $\alpha 1$ of the outer side front wheel at this time is calculated (T7). Next, the angles of the outer side front wheel (front wheel 2L) and the inner side front wheel (front wheel 2R) in a state where the steering wheel 14 is steered to the right to be fully locked are measured by the tester (T8). Then, a difference $\beta 4-\alpha 2$ between the turning angle $\beta 4$ (third turning angle) of the inner side front wheel and the turning angle $\alpha 2$ of the outer side front wheel at this time is calculated (T9).

Next, on the basis of the values measured and calculated in T1 to T9, whether or not a defect occurs in the wheel alignment is determined, and the cause of the defect is determined if there is a defect (T10).

The determination method of T10 will be described in detail. The determination uses the absolute value of the left-right difference $\Delta 1$ of an inner side/outer side difference related to turning angles measured in the state of the outer side front wheel with a turning angle of 20°, and an absolute value of the left-right difference $\Delta 2$ which is an inner side/outer side difference related to turning angles measured during the full-lock state. The inner side/outer side difference means a difference between the measured value on the inner side front wheel and the measured value on the outer side front wheel. The left-right difference means a difference between the value when the steering wheel 14 is steered to the left and the value when the steering wheel 14 is steered to the right. That is, the absolute value of the difference between the calculation results of T3 and T5, i.e., $|\Delta 1|=|\beta 1-\beta 2|$, and the absolute value of the difference between the calculation results of T7 and T9, i.e., $|\Delta 2|=|\alpha 1-\alpha 2-\beta 3+\beta 4|$ are used. If $|\Delta 2|$ is less than a threshold value, for example less than 1°, the wheel alignment is determined as to be in the normal range, and if $|\Delta 2|$ is 1° or more, the wheel alignment is determined as to be in an abnormal range (there is a defect in the wheel alignment). If the wheel alignment is determined as to be in an abnormal range, the cause is further determined as follows.

First, whether the $|\Delta 1|$ is equal to or greater than a threshold, for example, 30' or greater is determined. If $|\Delta 1|$ is less than 30', the defect in the wheel alignment is determined as to be caused by a cause other than the steering knuckle arms 13L and 13R. For example, the defect is considered as to be attributed to a cause other than the steering knuckle arms 13L and 13R, such as positional deviation of the rack 11, positional deviation of the side members and suspension members, and the like. On the other hand, if $|\Delta 1|$ is equal to or greater than 30', i.e., $|\Delta 1| \geq 30'$ and $|\Delta 2| \geq 1°$, it is determined that there is a high possibility of the steering knuckle arms 13L or 13R being bent.

Therefore, when $|\Delta 1| \geq 30'$ and $|\Delta 2| \geq 1°$, the defect in the steering knuckle arms 13L and 13R is determined as shown in Table 2, based on at least one of $\alpha 1$, $\alpha 2$, $\beta 3$ and $\beta 4$ obtained in T6 and T8. Further, a deviation in turning angles of the front wheels due to a defect in the steering knuckle arms 13L or 13R likely leads to the uneven wear of tires. Therefore, the uneven wear of tires is determined as shown in Table 2, based on the values of $\alpha 1$, $\alpha 2$, $\beta 3$, and $\beta 4$.

TABLE 2

| | | Defects in steering knuckle arm | | Uneven wear of tires | |
|---|---|---|---|---|---|
| Condition | | Left/Right | Turn direction | Left/Right | Position of Wear |
| $\beta 3 - Li \geq 2°$ | | Left | Inward | Left | Inside |
| $\beta 3 - Li \leq -2°$ | | Left | Outward | Left | Outside |
| $\beta 4 - Ri \geq 2°$ | | Right | Inward | Right | Inside |
| $\beta 4 - Ri \leq -2°$ | | Right | Outward | Right | Outside |
| $\alpha 1 - Lo \geq 2°$ | | Right | Outward | Left | Outside |
| $\alpha 1 - Lo \leq -2°$ | | Right | Inward | Left | Inside |
| $\alpha 2 - Ro \geq 2°$ | | Left | Outward | Right | Outside |
| $\alpha 2 - Ro \leq -2°$ | | Left | Inward | Right | Inside |

TABLE 3

| | |
|---|---|
| $\alpha 0$ | 20° (Turning angle of outer side front wheel) |
| $\alpha 1$ | Turning angle of outer side front wheel, when steered to left and fully locked. |
| $\alpha 2$ | Turning angle of outer side front wheel, when steered to right and fully locked. |
| $\beta 1$ | Turning angle of inner side front wheel, when steered to left and turning angle of outer side front wheel being 20°. |
| $\beta 2$ | Turning angle of inner side front wheel, when steered to right and turning angle of outer side front wheel being 20°. |
| $\beta 3$ | Turning angle of inner side front wheel, when steered to left and fully locked. |
| $\beta 4$ | Turning angle of inner side front wheel, when steered to right and fully locked. |
| Li | Normal turning angle of inner side front wheel, when steered to left and fully locked. |
| Lo | Normal turning angle of outer side front wheel, when steered to left and fully locked. |
| Ri | Normal turning angle of inner side front wheel, when steered to right and fully locked. |
| Ro | Normal turning angle of outer side front wheel, when steered to right and fully locked. |

The Li and Lo in the first column of Table 2 are normal values of the turning angles of the inner side front wheel (front wheel 2L) and the outer side front wheel (front wheel 2R) of the vehicle, when the steering wheel 14 is steered to the left to be in the full-lock state. The Ri and Ro are normal values of the turning angles of the inner side front wheel (front wheel 2R) and the outer side front wheel (front wheel 2L) of the vehicle, when the steering wheel 14 is steered to the right to be in the full-lock state.

The first column of Table 2 shows the conditions concerning the deviation in the turning angle during the full-lock state. For example, the condition "$\beta 4-Ri \geq 2°$" corresponds to a condition such that "the deviation from the normal value in the turning angle of the inner side front wheel (front wheel 2R) when the steering wheel 14 is steered to the right until the front wheels are fully locked is positive, specifically 2° or more". Further, the condition "$\alpha 1-Lo \leq -2°$" corresponds to a condition such that "the deviation from the normal value in the turning angle of the outer side front wheel (front wheel 2R) when the steering wheel 14 is steered to the left until the front wheels are fully locked is negative, specifically -2° or less". As described, the condition of the first column of Table 2 indicates: whether the rotation direction of the front wheels is right or left when the deviation in the turning angle is measured; which one of the front wheels 2L and 2R the deviation measured is related to; whether the deviation is positive or negative; and whether the deviation is a certain level or higher.

Figure 8A:
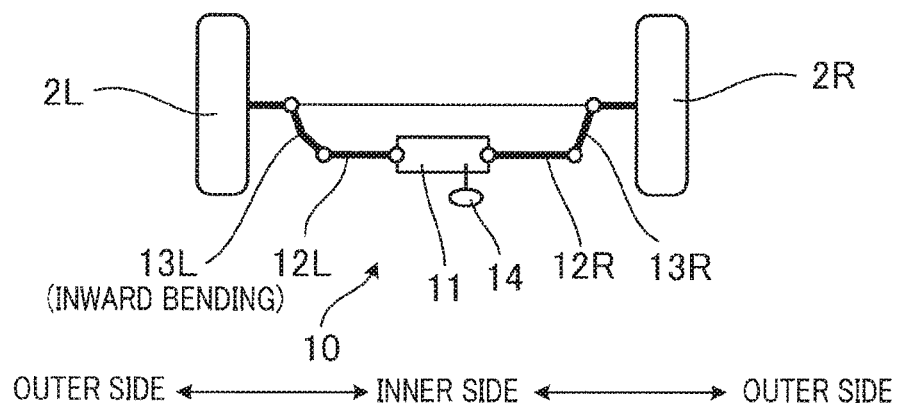
FIG. 8(a) shows a case where a left steering knuckle arm has an inward bending.
Figure 8B:
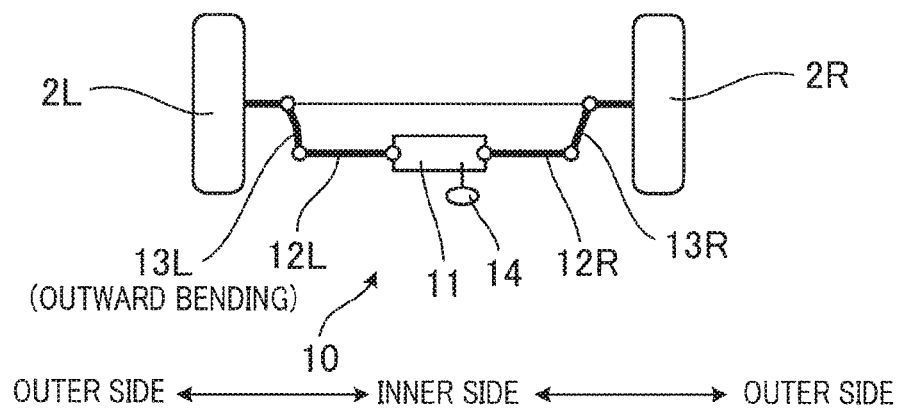
FIG. 8(b) shows a case where the left steering knuckle arm has an outward bending.

The second column of Table 2 shows which one of the steering knuckle arms 13L (left) or 13R (right) has a defect (bend). The third column shows whether a defect taking place in the steering knuckle arm is an inward bending or outward bending. FIG. 8(a) is an example where the steering knuckle arm 13L is bent inwardly. The rear portion of the steering knuckle arm 13L is bent inwardly (to the right in the drawing). FIG. 8(b) is an example where the steering knuckle arm 13L is bent outwardly. The rear portion of the steering knuckle arm 13L is bent outwardly (to the left in the drawing). As shown in the figures, when the steering knuckle arm 13L has a bend, the length of the tie rod 12L is adjusted so that the front wheels 2L and 2R are properly oriented to the straight-traveling state while the steering wheel 14 is in the center. As the result, the length of at least one of the tie rods 12L and 12R in FIG. 8 do not match with the length in FIG. 3. It should be noted that the above is similarly applied in cases where the steering knuckle arm 13R has a bend. In this case, the relationship between the inside and outside and the left and right is reversed from the case of the knuckle arm 13L. The fourth and fifth columns of Table 2 show an uneven ware takes place on which one of the inside and outside of which one of the left and right tires. Table 3 shows the contents of each variable.

An example determination based on Table 2 is as follows. When a difference $\beta 4-Ri$ resulting from subtracting the reference angle from the turning angle of the inner side front wheel (front wheel 2R) measured with the front wheels rotated towards right to be fully locked is negative, and is -2° or less, the right side steering knuckle arm 13R highly likely has an outward bend. In this case, uneven wear tends to take place on the outer side of the right tire. Further, when a difference $\alpha 2-Ro$ resulting from subtracting the reference angle from the turning angle of the left front wheel (outside) measured with the front wheels rotated towards right to be fully locked is positive, and is 2° or more, the left side steering knuckle arm 13L highly likely has an outward bend. In this case too, uneven wear tends to take place on the outer side of the right tire.

The following explains the reason why the cause of the defect in the wheel alignment is determined as described above. The determination is based on the following finding. Namely, when there is a defect in the wheel alignment due to the positional deviation of the rack 11 or the like, the deviation likely takes place in the turning angle during the full-lock state, whereas the deviation hardly takes place in the turning angle during the state of not fully locked. On the other hand, when the defect in the wheel alignment is attributed to a bend in the steering knuckle arm 13L or 13R, the deviation takes place in the turning angles of both during the full-lock state and the state of not fully locked.

Figure 9:
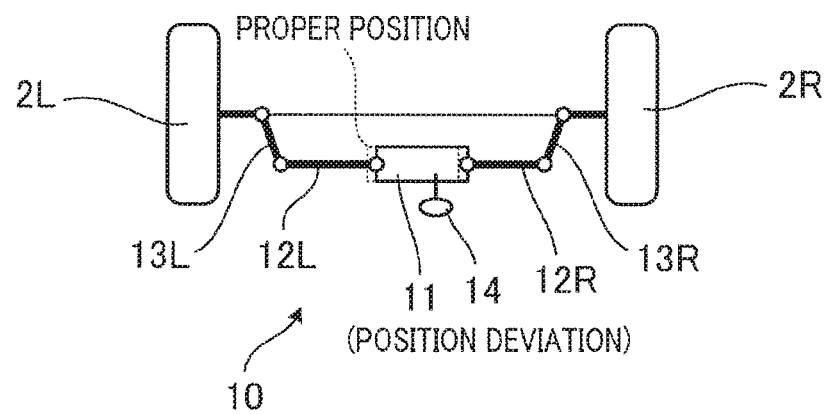
FIG. 9 is a schematic structure diagram of a steering device of the automobile shown in FIG. 1, and shows a case where a rack has a positional deviation.

For example, suppose that there is a positional deviation of the rack 11 relative to left-right directions due to a deviation in the position of setting the rack 11 with respect to the vehicle body. In this case, as described above, the lengths of the tie rods 12L and 12R are adjusted so that the front wheels are properly oriented to the straight-traveling direction while the steering wheel 14 is in the center. As an example, FIG. 9 shows a state in which the rack 11 is deviated towards right, and the lengths of the tie rods 12L and 12R are adjusted to direct the steering knuckle arms 2L and 2R and the left front wheel 2L and the right front wheel 2R are in the straight-traveling direction. When the steering wheel 14 is steered left or right from this state, the steering knuckle arms 13L and 13R are rotated through the tie rods 12L and 12R, respectively, according to the movement of the rack 11. If there is no abnormality in the steering knuckle arms 12L and 12R, the steering knuckle arms 12L and 12R properly rotate with a movement of the rack 11. For this reason, for example, when the front wheels are at any of the turning angles up to the angle of the full-lock state, deviation from the normal angle is unlikely to occur in the turning angles of the front wheels. However, since there is a deviation in the initial position of the rack 11, the position of the rack 11 at the time of full-lock state also deviates from the normal position, when the handle 14 is rotated until the front wheel is fully locked. For this reason, the turning angle tends to deviate from the normal angle, when the front wheels are nearby the full-lock state.

On the other hand, in cases where the steering knuckle arm 13L or 13R is bent as shown in FIG. 8, there will be a difference in the rotation amount (variation amount in the rotation angle) of the steering knuckle arm 13L or 13R with respect to a predetermined amount of movement of the rack 11, as compared with a case where the steering knuckle arms are normal. This difference in the rotation amount occurs from the time of starting steering the steering wheel 14, and increases as the front wheels approaches to the full-lock state. Therefore, when the steering knuckle arm 13L or 13R is bent, the deviation in the turning angle of the front wheel 2L or 2R from the state where the steering knuckle arms are normal is large to some extent also in the turning angles between the start of steering the steering wheel 14 and the full-lock state, e.g., a turning angle of 20°. The deviation increases with an increase in the turning angle of the front wheel.

Further, when the steering knuckle arm 13L or 13R is bent, the deviation in the turning angle is large even in turning angle of the front wheel before the full-lock state. The deviation in the turning angle of the front wheel 2L or 2R from its normal value is likely to shift inwardly or outwardly the load on the tires of the front wheels as compared with the normal case, when the automobile 1 runs a curve. For this reason, uneven wear on the inner side (so-called inner-tire wear) or uneven wear on the outer side (so-called outer-tire wear) tends to occur in the tire.

Figure 10:
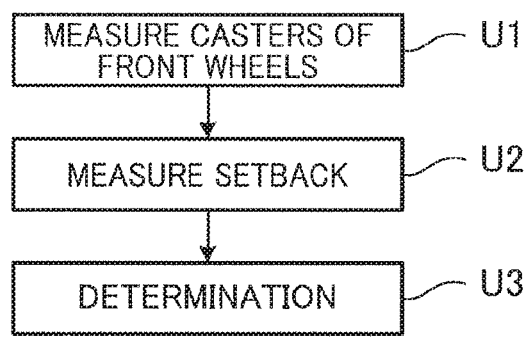
FIG. 10 is a flowchart showing a flow of steps executed in S7 of FIG. 6.

In S7, the process shown in FIG. 10 is executed. First, the caster angle γ1 of the front wheel 2L and the caster angle γ2 of the front wheel 2R are measured again (U1) and the setback angle Ψ is measured again (U2) by a tester. The cause is determined if there is a setback, based on the measurement results of U1 and U2(U3).

The determination method of U3 will be described in detail. First, whether or not the setback takes place is determined based on whether or not the setback angle Ψ measured in U2 is 10' (predetermined size) or more. It should be noted that, a value other than 10' may be used for determining whether or not the setback takes place. When it is determined that a setback takes place, whether the cause of the setback lies in the front side suspension device 20 or in the rear side suspension device 30 is determined, based on whether or not the left-right difference of the caster angles is 30' or less, i.e., whether or not |γ1−γ2|≤30' is established. When |γ1−γ2|>30' is established, the cause is determined as to be highly likely in the front side suspension device 20. If |γ1−γ2|≤30' is satisfied, the cause is determined as to be highly likely in the rear side suspension device 30. The reason for adopting the above condition is as follows. According to the experience of the present inventor in a large number of automobile maintenance in the past, (i) vehicles with |γ1−γ2| exceeding 30' have a problem in the front side suspension device 20, even if the 30' is exceeded only by 2 to 3'; (ii) the |γ1−γ2| of 30' or less has no problem in the front side suspension device 20; and (iii) the |γ1−γ2| may approximate 30' even in a vehicle having no problem in its front side suspension device 20. In view of the above, whether or not |γ1−γ2| exceeds 30' is adopted as the condition for determining whether the cause of the setback lies in the front side suspension device 20 or in the rear side suspension device 30.

When there is a problem in the front side suspension device 20, it is conceivable that, as the cause of the setback, the right side portion or the left side portion of the tension rods, the stabilizer, and the like constituting the front side suspension device 20 is stretched or damaged. When there is a problem with the front side suspension device 20, the cause of the setback is obtained based on the caster angle of which one of the left front wheel 2L and the right front wheel 2R is deviated from the normal value, and whether the caster angle deviates to a larger value or a smaller value. Specifically, the cause of the setback is obtained based on Table 4 below.

TABLE 4

| Setback | Caster Abnormality | | Cause of Setback | |
| --- | --- | --- | --- | --- |
| Negative/ Positive | Left/ Right | Deviation | Portions | Direction of Deviation |
| Negative (−) | Right | Small | Right | Rearward |
| Negative (−) | Left | Large | Left | Forward |
| Positive (+) | Left | Small | Left | Rearward |
| Positive (+) | Right | Large | Right | Forward |

The first column of Table 4 shows the positive/negative sign of the measured value of the setback angle Ψ. The second column of Table 4 shows the caster of which one of the left front wheel 2L and the right front wheel 2R is abnormal.

Whether or not the caster has an abnormality is determined as follows. The caster angle is supposed to be the initial set value published by the manufacturer of the automobile 1 at the time of manufacturing. Therefore, the closer the time of conducting the caster abnormality determination to the time of manufacturing the automobile 1, the closer the normal caster is to the initial set value. To the contrary, as the time elapses from the time of manufacturing the automobile 1, it is predicted that the value of the caster angle changes to a value different from the initial set value, even if the front side suspension device 20 and the like has no problem. For example, as the period of using the automobile 1 increase, the casters may increase with lowering of the vehicle body due to deterioration over time of the suspension and the like. Therefore, the normal value of the caster angle should be presumed to be larger than the initial set value, according to how much time has elapsed from the time of manufacturing the automobile 1, at the time of the caster abnormality determination. Thus, taking into account the change in the caster angle according to the deterioration over time and the like, whether the caster angle of any of the front wheels 2L and 2R corresponds to the normal value is determined. A front wheel different from the front wheel with the normal caster angle is the front wheel with an abnormality in the caster angle.

According to the experience of the present inventor in a large number of automobile maintenance in the past, the changes in the normal caster angle due to deterioration over time and the like do not cause a significant change in the caster such that the left-right difference in the caster angles is 30'. Therefore, when the |γ1−γ2| exceeds 30', the caster of one of the left front wheel 2L and the right front wheel 2R results in a value significantly exceeding the change of the normal caster angle due to deterioration over time or the like. Even if the accuracy of predicting the normal value according to the deterioration over time is not so high, whether or not there is an abnormality in the caster of either the left front wheel 2L or the right front wheel 2R is likely to be obvious. This is because the reference value of 30' is larger than changes in the normal caster, which is attributed to deterioration over time and the like.

The third row of Table 4 shows whether the abnormal caster is larger or smaller than the normal value. The fourth row of Table 4 shows which one of the left and right portions of the front side suspension device 20 has the cause of setback. The fifth row in Table 4 shows the direction of deviation of the front wheels due to the cause.

A determination based on Table 4 is as follows. As shown in Table 4, when the measured value of the setback angle Ψ is negative, it could be either one of the following cases: a case where the caster angle of the right front wheel 2R is smaller than the normal value; or a case where the caster angle of the left front wheel 2L is larger than the normal value. In the former case, the cause of the setback is highly likely due to rearward deviation of the right front wheel 2R which is attributed to elongation, damage, and the like of the right side portion of the tension rod, the stabilizer, and the like. In the latter case, the cause of the setback is highly likely due to forward deviation of the left front wheel 2L which is attributed to a bend, damage, and the like of the left side portion of the tension rod, and the like. As shown in Table 4, when the measured value of the setback angle Ψ is positive, it could be either one of the following cases: a case where the caster angle of the left front wheel 2L is smaller than the normal value; or a case where the caster angle of the right front wheel 2R is larger than the normal value. In the former case, the cause of the setback is highly likely due to rearward deviation of the left front wheel 2L which is attributed to elongation, damage, and the like of the left side portion of the tension rod, and the like. In the latter case, the cause of the setback is highly likely due to forward deviation of the right front wheel 2R which is attributed to a bend, damage, and the like of the right side portion of the tension rod, and the like. The determination method in cases of having a problem in the front side suspension device 20 is as described above.

On the other hand, when there is a problem in the rear side suspension device 30, the cause of the setback may be elongation or damage to the left side portion or the right side portion of the torque rod, the lower arm, the suspension member, and the like constituting the rear side suspension device 30. When the rear side suspension device 30 has a problem, the cause of setback is obtained based on the positive or negative sign of the measured value of the setback angle Ψ. When the measured value of the setback angle Ψ is negative, the cause is likely: a rearward deviation of the left rear wheel 3L due to elongation or damage of the left side portion of the torque rod and the like; a forward deviation of the right rear wheel 3R due to a bend or damage to the right side portion of the torque rod and the like. When the measured value of the setback angle Ψ is positive, the cause is likely: a rearward deviation of the right rear wheel 3R due to elongation or damage of the left side portion of the torque rod and the like; a forward deviation of the left rear wheel 3L due to a bend or damage to the right side portion of the torque rod and the like.

According to the above-described wheel alignment inspection method of the present embodiment, the wheel alignment is measured in S3 and S5 to S7 in FIG. 6. S3 and S5 to S7 are executed before and after S4 for adjusting the wheel alignment so as to eliminate the thrust angle. Therefore, in S8, it is possible to appropriately evaluate the state of the wheel alignment at a time of actual running based on the measurement result of S3, which most influences the steering pull and the uneven wear of tires, and in S5 to S7, it is possible to appropriately evaluate the cause of the defect in the wheel alignment. If only the process of S3 is performed and all the defects of the wheel alignment are eliminated based on the measurement result, it is not possible to appropriately grasp the cause of the defect in the wheel alignment. On the other hand, if only the steps S5 to S7 are performed without carrying out the step S3, it is not possible to properly evaluate the influence of the wheel alignment to the steering pull or the uneven wear of tires.

For example, according to the findings of the present inventor, when a thrust angle of 10' is taking place, there is a left-right difference of 1.2 mm in the individual toes of the front wheels 2L and 2R during the straight running. Due to this left-right difference of the individual toes, deviations as shown in Table 5 take place in the values of the wheel alignment due to the thrust angle. The size of the deviation corresponds to the absolute value of a difference between a value at the time of straight running with the thrust angle of 10' and a value at the time of straight running without the thrust angle.

TABLE 5

| | Deviation Amount |
|---|---|
| Left-right difference between individual toes of rear wheels 3L and 3R | Approx. 3 mm |
| Camber angles of front wheels 2L and 2R | Approx. 2' |
| Caster angles of front wheels 2L and 2R | Approx. 2' |
| Included angles of front wheels 2L and 2R | Approx. 4' |

TABLE 5-continued

| | Deviation Amount |
|---|---|
| Setback angle | Approx. 9' |
| Turning angles of front wheels 2L and 2R during full-lock state | Approx. 4' |

That is, for example, in cases where the automobile 1 before being subjected to the inspection method has a thrust angle of 10', if the process of S4 is executed without executing S3, information related to the defect in the wheel alignment as shown in Table 5 is not obtained. In this case, it may not be possible to sufficiently grasp the information on the defect of the wheel alignment for accurately explaining the level of the steering pull or the uneven wear of tires of the automobile 1 before being subjected to the inspection method. For example, at S6 in FIG. 6, the state of uneven wear of tires determined based on Table 2 and the state of actual uneven wear of tires taking place in the automobile 1 may not be consistent. To the contrary, with the present embodiment executing the process of S3 and the processes of S5 to S7 before and after the process of S4, it is possible to appropriately evaluate the state of the wheel alignment at a time of actual running, which most influences the steering pull and the uneven wear of tires, and to appropriately evaluate the cause of the defect in the wheel alignment.

Further, with the process of S6 out of the processes shown in FIG. 6, calculation of |Δ1| enables evaluation of the state of deviation in the turning angle when the turning angle of the outer side front wheel is 20°, and calculation of |Δ2| enables evaluation of the deviation in the turning angle during the full-lock state. For example, the state of the deviation in the turning angle during the full-lock state is evaluated based on whether or not |Δ2|≥1° is satisfied. This way, it is possible to evaluate if there is a defect in the wheel alignment. However, with the evaluation based on only |Δ2|, it may not be possible to distinguish whether the cause of the defect in the wheel alignment lies in the positional deviation of the rack 11 or in the bending of the steering knuckle arm 13L or 13R. In view of this, further evaluation is conducted on the state of deviation in the turning angle when the turning angle of the outer side front wheel is 20° based on whether |Δ1|≥30' is satisfied, in addition to whether |Δ2|≥1° is satisfied. This way, the possibility of a bend taking place in the steering knuckle arm 13L or 13R is evaluated. That is, by evaluating both Δ1 and Δ2, it is possible to distinguish whether the cause of the defect lies in the positional deviation and the like of the rack or in a bend taking place in the steering knuckle arm.

Further, what kind of bend takes place in the steering knuckle arm 13L or 13R is evaluated, based on the condition of Table 2: i.e., the rotation direction of the front wheels, the measured deviation is for which one of the front wheels 2L and 2R, and whether the deviation is a positive value or a negative value. Therefore, it is possible to determine in detail the state of defect in the steering knuckle arm 13L or 13R.

Further, according to the process of S7 out of the processes shown in FIG. 6, when there is a setback (the setback angle of a predetermined size (10') or more), whether the cause of the setback lies in the front side suspension device 20 or in the rear side suspension device 30 is evaluated based on whether or not the caster angles of the front wheels 2L and 2R has a left-right difference (whether or not |γ1−γ2|≥30' is satisfied). Further, based on which one of the front wheels 2L and 2R has an abnormal caster angle, which one of the left side portion and the right side portion of a part in the front side suspension device 20 has a problem is obtained.

As described, although it is a premise that no left-right difference between the toes of the front wheels 2L and 2R or between the rear wheels 3L and 3R through the process of S4, the setback and the casters are not unnecessarily adjusted in the process of S7, and the current status is measured as it is to appropriately grasp the cause of the setback.

The following describes a modification of the above-described embodiment. In the above-described embodiment, the caster angles γ, the camber angles η, the included-angles ζ, the turning angles α and β during the full-lock state, and the setback angle Ψ are measured again as the specific measurement targets in S5 to S7. However, it may be some of the above that are measured. For example, only S6 may be executed. In this case, measurement is performed only on the turning angle of the front wheels 2L and 2R. In this measurement, it is only the adjustment of the individual toes of the front wheels 2L and 2R out of adjustment in S4, which directly influences the measured values. Therefore, in the process of S4 in FIG. 6, the adjustment of the individual toes may be performed only for the front wheels, without adjustment of the individual toes for the rear wheels. In the above embodiment, the adjustment of the individual toes for the rear wheels concerns only the measurement of the setback angle Ψ of S7, among the measurements of the wheel alignment in S5 to S7. Therefore, if the setback angle Ψ is not measured, the individual toes of only the front wheels may be adjusted in S4. On the other hand, if the measurement after S4 includes the setback angle Ψ, the individual toes need to be adjusted for both the front wheels and the rear wheels in S4.

Further, in S6 in FIG. 6, the state of deviation in the turning angle when the turning angle of the outer side front wheel is 20° and the state of deviation in the turning angle during the full-lock state are evaluated based on whether or not the |Δ1|≥30' is satisfied and whether or not the |Δ2|≥1° is satisfied. However, the evaluation of the deviation in the turning angle may be based on other conditions. For example, numerical values other than 30' or 1° may be used. It is also possible to evaluate whether or not α1, α2, β1 to β4 satisfy a predetermined condition without using Δ1 or Δ2. As an example, by comparing α1 and β2 with their normal values, it is possible to evaluate the deviation in the turning angle as a deviation from the normal value. In short, any method is adoptable as long as the method enables evaluation of how much deviation takes place in the turning angle of the outer side front wheel with the turning angle of 20°, and how much deviation takes place in the turning angle during the full-lock state.

Further, in S6 of FIG. 6, the turning angle of the inner side front wheel when the turning angle of the outer side front wheel is 20° is measured as α1 and α2. However, the turning angle of the outer side front wheel when the turning angle of the inner side front wheel is 20° may be measured. Further, the turning angle may not be 20° and may by any other angle smaller than the angle at full-lock state.

Further, in S6 of FIG. 6, the cause of the defect in the wheel alignment is determined based on the turning angles of the front wheels in a state of the outer side front wheel with a turning angle of 20° and the turning angles of the front wheels during the full-lock state. However, the cause of the defect in the wheel alignment may be determined based on the turning angles of the front wheels in a state of the outer side front wheel with a turning angle of θ1 (θ1<angle during the full-lock state) and the turning angles of the front wheels in a state of the outer side front wheel with a turning angle of θ2 (θ2≥θ1).

For example, a difference Δa is calculated which is a difference between the turning angle (first turning angle) of the right front wheel in a state where the left front wheel is rotated to the right (first direction) to the turning angle θ1 (first angle), and the turning angle (second turning angle) of the left front wheel in a state where the right front wheel is rotated to the left (second direction) to the turning angle θ1. Further, a difference Δb is calculated which is a difference between the turning angle (third turning angle) of the right front wheel in a state where the left front wheel is rotated to the right to the turning angle θ2 (second angle), and the turning angle (fourth turning angle) of the left front wheel in a state where the right front wheel is rotated to the left to the turning angle θ2. Although θ2 is larger than θ1, whether it is a turning angle in the full-lock state or not is not a concern. If the absolute value of Δa is larger than the first threshold value and the absolute value of Δb is larger than the second threshold value which is larger than the first threshold value, it is determined that the steering knuckle arm 13L or 13R is highly likely bent. As described, it may be determined that there is a bend in the steering knuckle arm 13L or 13R, by evaluating the change in the deviation of the turning angle when the turning angle is changed. Further, through a method similar to the above-described embodiment based on Table 1, it is possible to grasp in detail which one of the steering knuckle arms 13L and 13R is bent in what way, based on how the turning angle of the front wheel deviates from the reference angle.

Further, in this modification too, it is also possible to evaluate by directly determining whether or not the measured value of the turning angle satisfy a predetermined condition without using Δa or Δb. As an example, it is possible to evaluate as a deviation state, how much a turning angle deviates from the normal value, by comparing, with the normal value, the turning angle of the left front wheel measured in a state where the right front wheel is rotated to the left to the turning angle θ1. In short, any method is adoptable as long as the method enables evaluation of how much deviation takes place in the turning angle of the outer side front wheel with the turning angle of θ1, and how much deviation takes place in the turning angle in a state where the turning angle of the outer side front wheel is θ2.

It should be noted that, even without the measurement by changing the turning angle, it is possible to determine that there is some kind of abnormality in parts of the steering device (the rack 11, the knuckle arms 13L, 13R, and the like), if there is a deviation in the turning angle of the inner side front wheel (front wheel 2L) when the outer side front wheel is rotated to the left to a non-full-lock turning angle, and in the turning angle of the inner side front wheel (front wheel 2R) when the outer side front wheel is rotated to the right to the same turning angle. However, only the measured values of these two turning angles do not allow a change in the deviation of the turning angle, when the turning angle is changed. Therefore, in order to narrow down the cause of the defect in the wheel alignment in more detail, it is preferable to obtain the measured value of the turning angle after changing the turning angle.

Further, in the S7 of FIG. 6, the caster angle is measured in order to obtain the size of the caster. However, the size of the caster may be obtained by other methods. For example, the size of the caster may be obtained by measuring the height of the caster trail and the axle center position. The caster angle can be obtained from the angle of the triangle with (caster trail)/(the height of the axle center position) as a tangent. It should be noted that, occurrence of a left-right difference between the casters of the front wheels 2L and 2R and the like may be determined by directly using (caster trail)/(height of the axle center position). In this case, the reference value (such as 30' and the like in the above embodiment) used for determination is replaced with a value corresponding to (caster trail)/(height of axle center position).

Further, in the S7 of FIG. 6, when there is a left-right difference between the casters of the front wheels 2L and 2R, which one of the left and right portion of the parts of the front side suspension device 20 is evaluated based on which one of the casters is abnormal. However, it is possible to independently perform the evaluation on which one of the front side suspension device 20 and the rear side suspension device 30 has a problem, based on whether or not there is a left-right difference between the casters of the front wheels 2L and 2R. Further, which one of the left and right portion of the parts of the front side suspension device 20 has a problem may be evaluated based on which one of the left and right casters is abnormal. Further, if the caster of either one of the front wheels 2L and 2R is determined as to be abnormal, as a result of comprising the caster angles with the normal value, the front side suspension device 20 may be determined as to have a problem. Further, if the caster of either one of the front wheels 2L and 2R is determined as to have no abnormality, as a result of comprising the caster angles with the normal value, the rear side suspension device 30 may be determined as to have a problem.

Further, in the above embodiment, the individual toe is the distance between a wheel and the geometric center line. However, the individual toe may be represented by the angle of each wheel. In this case, the reference value (e.g., 0.5 mm in the above embodiment) used for determination based on the individual toe is replaced by a value corresponding to the angle of the wheel.

Further, in S2 of the above embodiment, the position of the steering wheel 14 is set to the position confirmed in S1 based on the marker and the like to simulate the state of the steering wheel 14 during straight running. During this step, it is possible to determine whether or not the position of the steering wheel 14 is truly in the straight-traveling state. Then, as a result of the determination, if the steering wheel 14 is not in a truly straight-traveling state, the position of the steering wheel 14 may be corrected so that the front wheels are truly in the straight-traveling state. To enable such determination, the tester of the above embodiment may be configured to be capable of obtaining the front end position and the rear end position of each front wheel. For example, the front end position of the front wheel 2R is the position of an intersection on the front side, out of two intersections of the outline of the front wheel 2R and the two-dot chain line in FIG. 2. Further, the rear end position of the front wheel 2R is the position of an intersection on the rear side, out of the two intersections of the outline of the front wheel 2R and the two-dot chain line in FIG. 2. By obtaining these front end position and the rear end position, it is possible to obtain the direction of the front wheel (direction along the two-dot chain line) in plan view. Thus, it is possible to determine whether or not the direction of the front wheel is truly parallel to the thrust line. Using this, it is possible to determine whether or not the position of the steering wheel 14 is truly in the straight-traveling state. Further, by obtaining the front end position and the rear end position, it is possible to know the front wheel deviates in which direction by how much from the thrust line. Then, based on the deviation state, the position of the steering wheel 14 is corrected so that the front wheels are truly in the straight-traveling state.

REFERENCE SIGNS LIST 1. automobile
2L. front wheel (left front wheel)
2R. front wheel (right front wheel)
3L. rear wheel (left rear wheel)
3R. rear wheel (right rear wheel)
10 steering device
20 front side suspension device
30 rear side suspension device
C. geometric center line

The invention claimed is:

1. A method of inspecting wheel alignment, comprising:
a first alignment measurement step of measuring wheel alignment with reference to positions of front wheels during straight running of a vehicle causing a thrust angle, wherein at least one of front wheel camber, front wheel caster, a front wheel included-angle, setback, and a turning angle when the front wheels are rotated to a predetermined state is measured as a specific measurement target;
an adjustment step of adjusting the individual toes after the first alignment measurement step, wherein the individual toes are adjusted to eliminate a left-right difference in relation to the front wheels and rear wheels of the vehicle, when the specific measurement target includes the setback, whereas the individual toes are adjusted to eliminate the left-right difference in the individual toes at least in relation to the front wheels of the vehicle, when the specific measurement target does not include the setback;
a second alignment measurement step of measuring again the wheel alignment, relative to the specific measurement target after the adjustment step;
a first evaluation step of evaluating a defect of wheel alignment which influences at least one of wear on tires and steering pull in the vehicle before the adjustment step, based at least on the measurement result of the first alignment measurement step; and
a second evaluation step of evaluating a cause of a defect in the wheel alignment, based at least on the measurement result of the second alignment measurement step.

2. The method according to claim 1, wherein the second alignment measurement step includes a step of measuring a first turning angle of a right front wheel, while a left front wheel is rotated in a first direction which is one of left and right direction so that a turning angle of the left front wheel is a first angle which is smaller than an angle corresponding to full-lock, and a step of measuring a second turning angle of the left front wheel, while the right front wheel is rotated in a second direction which is opposite to the first direction so that a turning angle of the right front wheel is the first angle; and
wherein, in the second evaluation step, a cause of a defect in the wheel alignment is evaluated, based at least on the first turning angle and the second turning angle.

3. The method according to claim 2, wherein the second alignment measurement step includes a step of measuring a third turning angle of the right front wheel, while the left front wheel is rotated in the first direction so that a turning angle of the left front wheel is the full-lock or a second angle which is different from the first angle, and a step of measuring a fourth turning angle of the left front wheel, while the right front wheel is rotated in the second direction so that the turning angle of the right front wheel is the full-lock or the second angle; and wherein, in the second evaluation step, a cause of the defect of the wheel alignment is evaluated by evaluating a change in deviation of the turning angle with respect to the turning angle of the front wheels, based at least on the first turning angle to the fourth turning angle.

4. The method according to claim 1, wherein in the second alignment measurement step, the setback and the caster of a left front wheel and a right front wheel are measured; and in the second evaluation step, when the setback is a predetermined size or more, a cause of the setback taking place is evaluated, based on at least either one of the following factors: whether or not the caster of the front wheels has a left-right difference; and the caster of which one of the left front wheel and the right front wheel has an abnormality.

* * * * *